May 21, 1963
P. J. BURGESS
3,090,116
METHOD OF COLD BONDING METALLIC PARTS
Filed Nov. 4, 1957
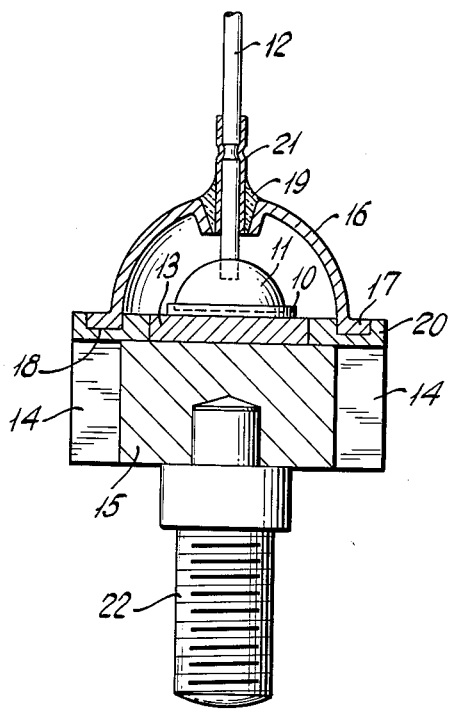
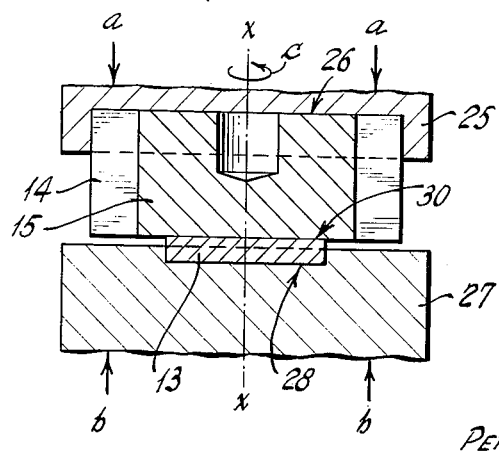
INVENTOR
PETER JOHN BURGESS
BY *Kwt Nau*
ATTORNEY

Patent 3,090,116 — May 21, 1963

3,090,116
METHOD OF COLD BONDING METALLIC PARTS
Peter John Burgess, Winchmore Hill, London, England, assignor to The General Electric Company Limited, London, England
Filed Nov. 4, 1957, Ser. No. 694,311
1 Claim. (Cl. 29—470.1)

The present invention relates to the bonding together of metallic parts, and among the objects of the invention is to provide a method of bonding together metallic parts which avoids the use of heat and large forces or pressures which might be damaging to the parts or the associated equipment.

There is already known a method of joining metallic members by pressure only without the use of external welding heat, whereby a pressure is applied to a localized interfacial area between two members of such a magnitude as to cause an intense metal flow at said area accompanied by a mutual interfacial action, to result in the formation of a solid phase welding bond between the members. Such an intense interfacial metal flow as required with a method of this type, known as cold pressure welding, has been found to be a prerequisite for achieving an efficient and reliable cold weld joint, the pressures required for effecting welding being of the order of magnitude of several tons per square inch.

While the actual physical phenomena underlying the formation of a cold weld joint of this type have not as yet been fully ascertained, there is good reason to believe that one of the fundamental effects of the interfacial metal flow, aside from forcing out or removing air and other residual surface contamination of the mating metal surfaces, to provide a pure metal-to-metal contact, is a stretching or coexpansion of the mating surfaces at the interface. This, together with the close approach of the surfaces to a distance within molecular dimensions as a result of the applied welding pressure, gives rise to molecular attraction and other interfacial action between the members, to result in a mechanically strong solid phase bond or weld.

As pointed out, the use of intense pressures to achieve cold pressure welding may distort or damage the parts being welded or associated equipment, in particular where the parts are of a delicate nature, such as in the case of solid state electronic devices (rectifiers, transistors etc.) sealed in a metallic casing by cold pressure welding.

Accordingly, a more specific object of the present invention is the provision of an improved cold bonding method for joining metallic members which, while requiring relatively low pressure compared with conventional cold pressure welding techniques, achieves the necessary stretching or coexpansion of the mating metal surfaces by an additional relative interfacial motion applied to said members simultaneously with the operating pressure.

Another object of the invention is the provision of a cold bonding method of this type which is both simple and which can be carried into effect expeditiously and by the aid of relatively simple means or welding tools.

According to one aspect of the present invention, in a method of bonding together two metallic parts, the surface of one of the parts consisting of soft metal, the surfaces of the two parts are slid one over the other to form a clean surface of the soft metal upon the one part, and simultaneously the two parts are pressed together to effect a bond between the said clean surface of the other part.

According to another aspect of the present invention, in a method of bonding together two metallic parts each having a surface of soft metal, the surfaces of the two parts are slid one over the other to form upon each part a clean surface of the soft metal, and in addition and simultaneously the two parts are pressed together to effect a bond between the said clean surfaces.

It will be appreciated that the newly formed metallic surface has a much higher free energy than a surface which has been exposed to the atmosphere for some time and which has become covered, for example, with an oxide layer. If the oxide layer on a surface which has been exposed is disrupted, a new or clean metallic surface is formed, and the term "clean surface" as used for the purpose of this specification is intended to mean such a new metallic surface providing a pure interfacial metal-to-metal contact between the members.

It will also be appreciated that in order to form such a new metallic surface by applying pressure to the surface, it is necessary to cause plastic flow of the surface layer. This may be achieved by applying a force in a direction normal to the surface, as in the conventional cold welding process, the pressure required in the latter being of the order of several tons per square inch, as pointed out hereinabove.

The inventor has found, however, that, with certain soft metals such as indium, the pressure required to cause plastic flow of the metal to form a clean surface can be very much reduced if the force normal to the surface is accompanied by a transverse force to promote the stretching or coexpansion of the mating surfaces conducive to an intimate bonding or joining of the members, in the manner as pointed out hereinabove. In the case of indium, for example, the required pressure is of the order of 15 lbs. per square inch and of the same order of magnitude for other soft or cold pressure weldable metals suitable for carrying into effect the present invention.

Looked at from a somewhat different angle, the present invention involves generally the relative movement of one metal surface upon the other under conditions of a predetermined force applied to the members, to result in an interfacial pressure in a direction normal to the interface between the members such as to produce clean metallic surface areas of said members and a certain interpenetration of the metal crystals of one metal member into the other.

One method of carrying the invention into effect will now be described by way of example, as applied to the construction of a solid state electronic device in the form of a power rectifier, reference being had to the accompanying drawing forming part of this specification and wherein:

FIG. 1 is a cross-sectional view through a semiconductive power rectifier mounted in a metallic housing sealed by a cold bonding method according to the invention; and FIG. 2 illustrates schematically a simple tool assembly for carrying into effect the invention.

Referring to FIG. 1, the semiconductive power rectifier device shown comprises essentially a germanium or equivalent semiconductive element 10 having fused thereto a bead 11 of indium to which is attached one of the terminal leads or electrodes 12 of the device, the elements 10 and 11 constituting a known fused semiconductor junction. The other electrode is constituted by a cylindrical copper block or disc 13, the semiconductor element 10 being attached to this block in any known manner, such as by soldering. A cooling fin system comprising a number of cooling fins 14 mounted upon a cylindrical copper core 15 may be attached to the block 13, the core and the block forming a heat sink and being arranged coaxially and bonded directly together end to end.

A hermetic enclosure for the rectifying junction 10, 11 comprises an inverted cup-shaped envelope 16 consisting of copper or the like metal and having a lower flanged rim 17 seated in an annular channel 18 provided in a further disc-shaped member or support 20 of copper, nickel plated stainless steel or the like metal, the cylindrical block 13 passing through a central opening of the member 20 and being attached thereto in a vacuum-tight manner by press fit engagement, soldering or in any other suitable manner. The rim 17 preferably closely fits the groove 18, whereby the latter acts as a guide for the relative rotation of the parts 16 and 20 during the cold bonding operation, while leaving a sufficient normal clearance for the coating of the meeting surfaces with a layer of indium or other bonding metal, as described in greater detail hereafter.

The rim 17 of the cap or envelope 16 is attached to the member 20 to form a hermetic seal or bond, the method of attachment by cold bonding being described in detail hereafter. A sleeve member 21 of copper or the like is insulatingly attached to the envelope 16 in a central opening in the upper end thereof, the attachment being effected, for instance, by a copper sealing glass bead 19 or the like insulating sealing material. The sleeve 21 is crimped in vacuum tight manner onto the flexible electrode lead 12 attached to the indium bead 11 of the rectifier junction.

Item 22 is a threaded fixing stud soldered into a hole in the block 15 and forming a cooperating terminal of the rectifier. In place of a single-junction device, such as a rectifier, as shown for illustration, the semiconductive device may be of any other type comprising a plurality of semiconductive elements, such as a transistor having three or more elements of different conductivity type (P or N), suitable terminal leads being provided for the various elements, in a manner readily understood. In the embodiment shown in FIG. 1, member 13 may be rigid with either member 15 or 20, while other modifications and details not necessary for the understanding of the invention will be made, as will be evident to those skilled in the art.

In order to attach the cooling member 14, 15 to the cylindrical member 13 by cold bonding according to the present invention, a coating of indium or equivalent soft or ductile metal is first applied to the end surface of member 13 which is remote from the rectifying element and also to one of the end faces of the core 15 of the cooling system. The two indium coated surfaces are next brought into contact in a suitable welding tool having upper and lower tool members 25 and 27 provided with recesses 26 and 28 to receive the members 13, 14 and 15, respectively, as shown in FIG. 2. The members are then pressed together in a suitable press under a pressure of about 15 lbs. per square inch, as indicated by the arrows $a$ and $b$ in the drawing. While this pressure is being applied, one mating surface is rotated relative to the other, that is, about the common axis $x$—$x$ as indicated by the circular arrow $c$. A single rotation of 180° within a period of about two seconds has been found sufficient to provide a satisfactory bond between the core 15 and the member 13 supporting the semiconductive element.

The members 13 and 14, 15 placed in the tool members 25 and 27 may be prevented from slipping or rotation relative to the tools in any suitable manner, such as by providing a sufficient degree of friction at the contact surfaces 26 and 28 between the members and the tools, as compared with the friction at the interface 30. The required friction may be achieved by roughening of the inner tool surfaces 26 and 28. Alternatively, rotation preventing means in the form of key and slot arrangements or the like may be provided to restrict relative motion between the members to the interface 30 upon rotation of the tool members 25 and 27 relative to one another during a welding or bonding operation.

Prior to enclosing the rectifying element 10, 11 in the envelope 16, the electrode or flexible lead 12 is bonded to the indium bead 11. This is preferably done by a coating of indium being applied to the electrode 12 and by the coated surface of the electrode being pressed against the bead 11 and rotated relative to the bead to effect a bond. Indium having already been applied to the annular channel 18 in the member 20 by soldering, to form therein a ring of indium, a coating of indium is applied to the lower flanged rim 17 of the envelope. The rim is next placed in contact with the indium ring in the groove 18, to enclose the element, the free end of the flexible lead projecting up inside the sleeve 21, and rotated slowly for one revolution while pressed against the indium ring under a pressure of 15 lbs. per square inch. This operation may be carried out in an inert atmosphere. Finally the sleeve member 21 is crimped onto the flexible lead to provide a good electrical connection to the rectifying element.

As an alternative to forming an indium surface on each of the parts to be bonded, for example the core 15 of the fin system and the cylindrical copper block 13, such a surface may be formed on one of the parts only. The surface of the other part must of course be cleaned, and is bonded to the indium surface by rotating the surfaces relatively one to the other and at the same time pressing them together as before.

It will be seen that the method is especially suitable for bonding together metal parts having cooperating faces which are planar or non-planar surfaces of revolution, but it is also applicable to the bonding together of surfaces which cannot be relatively rotated provided they may be slid one over the other during the pressing operation.

While the invention has been described with specific reference to indium as bonding metal, it will be understood that other soft and cold weldable metals or metal alloys may be used for producing a cold weld bond, such as lead, silver, cadmium etc. being coated or soldered onto a base metal in the form of a thin layer in the manner described herein or, alternatively, solid parts of such metals or metal alloys may be bonded by pressure and relative interfacial motion, in accordance with the broader scope and principle of the invention, as set forth in the appended claim. The specification and drawing are accordingly to be regarded in an illustrative rather than in a limiting sense.

I claim:

A method of cold pressure bonding two members having fractional surface areas adapted to engage one another in mutual mating relation, at least one of said areas being a surface of revolution in respect to a predetermined axis, said method comprising coating said areas with layers of indium, arranging said members with the coated areas in contacting relation, applying a bonding pressure to the contacting members of the order of 15 lbs. per square inch while simultaneously relatively rotating the members about said axis with a relative speed between said members of the order of one half revolution during two seconds.

(References on following page)

References Cited in the file of this patent

UNITED STATES PATENTS

| | | |
|---|---|---|
| 1,220,772 | Murray | Mar. 27, 1917 |
| 1,624,501 | Nelson | Apr. 12, 1927 |
| 1,661,448 | Taylor | Mar. 6, 1928 |
| 2,335,958 | Parker | Dec. 7, 1943 |
| 2,671,746 | Brew | Mar. 9, 1954 |
| 2,698,548 | Sowter | Jan. 4, 1955 |
| 2,751,808 | MacDonald et al. | June 26, 1956 |
| 2,795,039 | Hutchins | June 11, 1957 |
| 2,830,920 | Colson et al. | Apr. 15, 1958 |
| 2,946,119 | Jones et al. | July 26, 1960 |
| 3,006,068 | Anderson et al. | Oct. 31, 1961 |
| 3,046,649 | Brennan | July 31, 1962 |

FOREIGN PATENTS

| | | |
|---|---|---|
| 572,789 | Great Britain | Oct. 24, 1945 |

OTHER REFERENCES

The Review of Scientific Instruments, vol. 25, No. 9, 862–864, September 1954.